Jan. 1, 1946.    J. R. McLAUGHLIN    2,391,915
TUBE TELESCOPING MACHINE
Filed Oct. 23, 1942    5 Sheets-Sheet 1

INVENTOR.
JOHN R. MCLAUGHLIN.
BY
ATTORNEY.

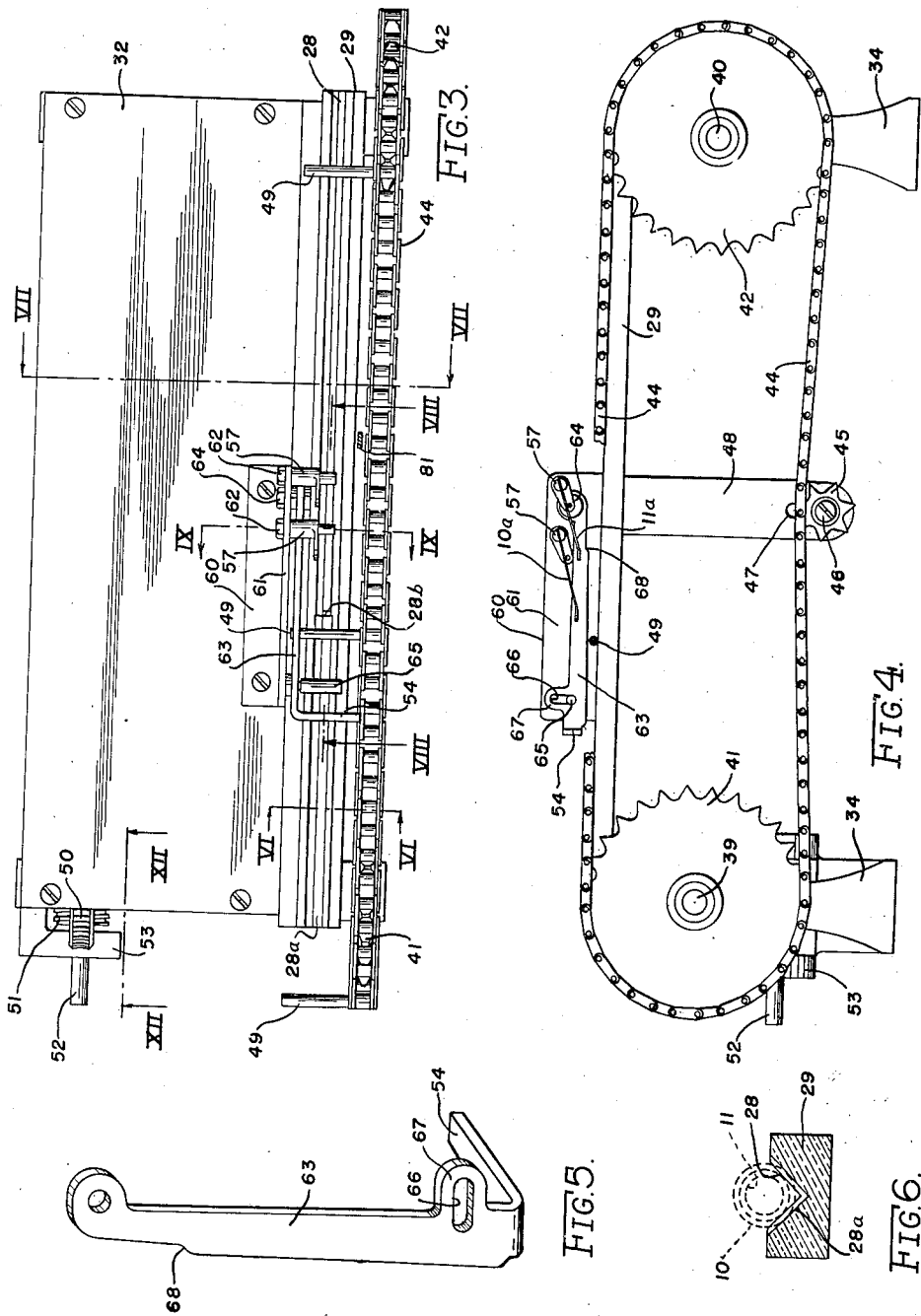

Jan. 1, 1946.   J. R. McLAUGHLIN   2,391,915
TUBE TELESCOPING MACHINE
Filed Oct. 23, 1942   5 Sheets-Sheet 3

INVENTOR.
JOHN R. MCLAUGHLIN.
BY
ATTORNEY.

Jan. 1, 1946.                J. R. McLAUGHLIN                 2,391,915
                           TUBE TELESCOPING MACHINE
                            Filed Oct. 23, 1942            5 Sheets-Sheet 4

INVENTOR.
JOHN R. McLAUGHLIN.
BY *Harry C. Geberts*
ATTORNEY.

Jan. 1, 1946.　　　　J. R. McLAUGHLIN　　　　2,391,915
TUBE TELESCOPING MACHINE
Filed Oct. 23, 1942　　　　5 Sheets-Sheet 5

INVENTOR.
JOHN R. MCLAUGHLIN.
BY
ATTORNEY.

Patented Jan. 1, 1946

2,391,915

UNITED STATES PATENT OFFICE 2,391,915

TUBE TELESCOPING MACHINE

John R. McLaughlin, New Brunswick, N. J., assignor, by mesne assignments, to Tampax Incorporated, New York, N. Y., a corporation of Delaware Application October 23, 1942, Serial No. 463,091

15 Claims. (Cl. 93—77)

This invention relates to tube assembly devices and more particularly to a tube telescoping machine, although certain features thereof may be employed with equal advantage for other purposes.

It contemplates more especially the provision of a machine for continuously assembling tubes that are generally adapted for telescopic association for any desired purpose such as applicators for catamenial devices described and claimed in United States Letters Patent No. 2,024,218.

One object of the present invention is to simplify the construction and improve the operation of devices of the character mentioned.

Another object is to provide improved means for continuously assembling tubes sized for telescopic association to comprise a unit.

Still another object is to provide continuous power means for automatically assembling tubes sized for telescopic association.

A further object is to provide improved means for combining telescopic tubes of paper or other deformable substances without impairment thereto.

A still further object is to provide improved means for feeding tubes of different size and effecting their telescopic association in a continuity of operation.

Still a further object is to provide improved displacing means for tubes sized for telescopic association to effect their assembly as a unit.

Other objects and advantages will appear from the following description of an illustrative embodiment of the present invention.

In the drawings:

Figure 3 is a fragmentary plan view of a tube guide and telescoping means.

Figure 4 is a front view in elevation of the tube guide and telescoping means shown in Figure 3.

Figure 5 is a perspective view of the lever trip shown in Figures 3 and 4.

Figure 6 is a sectional view of the tube guide taken substantially along line VI—VI of Figure 3.

Figure 1:
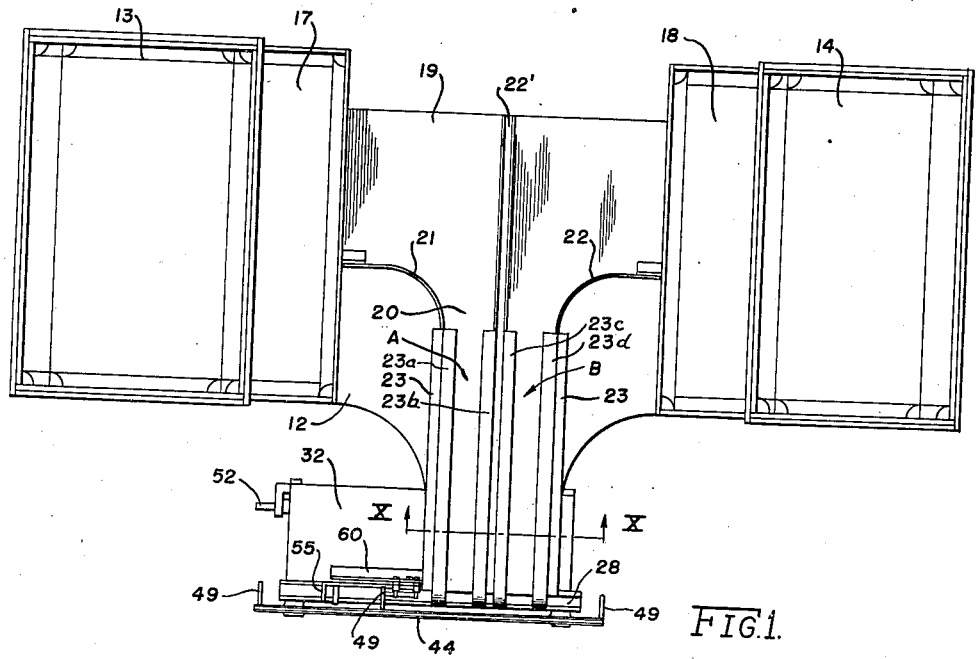
Figure 1 is a plan view of a device embodying features of the present invention.
Figure 2:
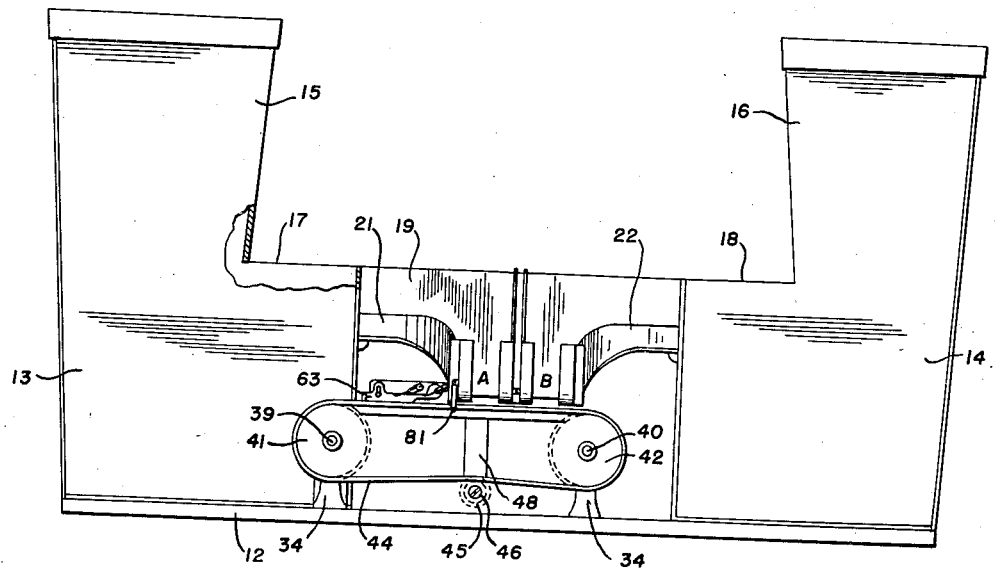
Figure 2 is a front view in elevation of the device shown in Figure 1.

The structure selected for illustration is intended for assembling telescoped tubes 10—11 (Figures 13, 14, and 15) which are preferably though not essentially sized for frictional telescopic association to comprise a unit such as a paper applicator utilized to confine a catamenial device of the type fully disclosed and described in United States Letters Patent No. 2,024,218. In this particular instance, the tubes 10—11 are constructed of disposable paper material so that the assembly thereof must be effected without impairment thereto.

In the present disclosure, the bed 12 of a suitable support serves to provide the bottoms of spaced rectangular bins 13 and 14 comprising a confining medium for tubes 10 and 11, respectively, which are dumped therein without predetermined arrangement to effect gravity feeding thereof to the instrumentalities to be hereinafter described. Suitable hoppers 15 and 16 extend upwardly from the respective bins 13 and 14 and are off-set outwardly with respect to the centers of said bins to provide access openings 17 and 18 towards the center of the bed 12, through which openings 17—18 the operator may conveniently remove quantities of large and small tubes 10 and 11 from the respective bins 13 and 14 for feeding them towards the telescoping mechanism.

Figure 10:
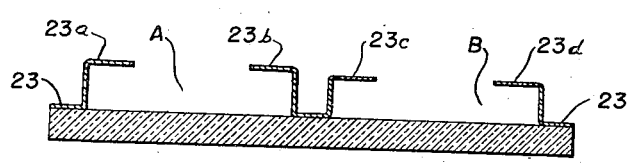
Figure 10 is a sectional view taken substantially along line X—X of Figure 1.

Attached to and extending between the adjacent or facing walls of the respective bins 13 and 14 is an inclined plate which has a rectangular body portion 19 and a reduced narrow extension 20 that projects laterally from the central portion of an edge thereof. Curved upstanding rims 21 and 22 are continuous along the edge of the body portion 19 of the plate and the merging edge of the extension 20. A dividing strip 22' is secured centrally to the plate 19 and divides the extension 20 into two side portions, and side strips 23 are mounted on the edges of the extension 20. A plurality of angle-metal strips 23a, 23b, 23c, and 23d of preferably L-shape in cross-section are secured to the side strips 23 and to the dividing strip 22', and said angle-strips are disposed with their horizontal flanges uppermost and extending towards each other in the manner shown in enlarged detail in Figure 10. The structures above described provide inclined guides or chutes (identified generally as A and B), into which the operator deposits the tubes 10 and 11 in elongated rows with the sides of the tubes in contact with each other. Since the tubes 10 have larger diameters than the tubes 11, the left-hand chute A illustrated in the drawings is of greater depth between its bottom and the horizontal flanges of the angle-metal strips 23a and 23b as shown in detail in Figure 10. At their lower discharge ends the chutes A and B have the adjacent ends of the angle-metal strips 23a, 23b, 23c, and 23d, curved downwardly to permit of the ready delivery of the tubes 10 and 11 therefrom.

The discharge ends of the chutes A and B are adapted to deposit a tube 10 and a tube 11 into a V-shaped groove or channel 28 that is formed in the upper surface of an elongated flat bar of glass, molded composition, or other suitable material 29 that extends the length of a table or the like that is in a horizontal plane below the lower ends of the chutes A and B, said bar 29 being supported upon the lateral flange of an angle-metal strip 30 that is secured to the table by bolts 31.

Figure 7:
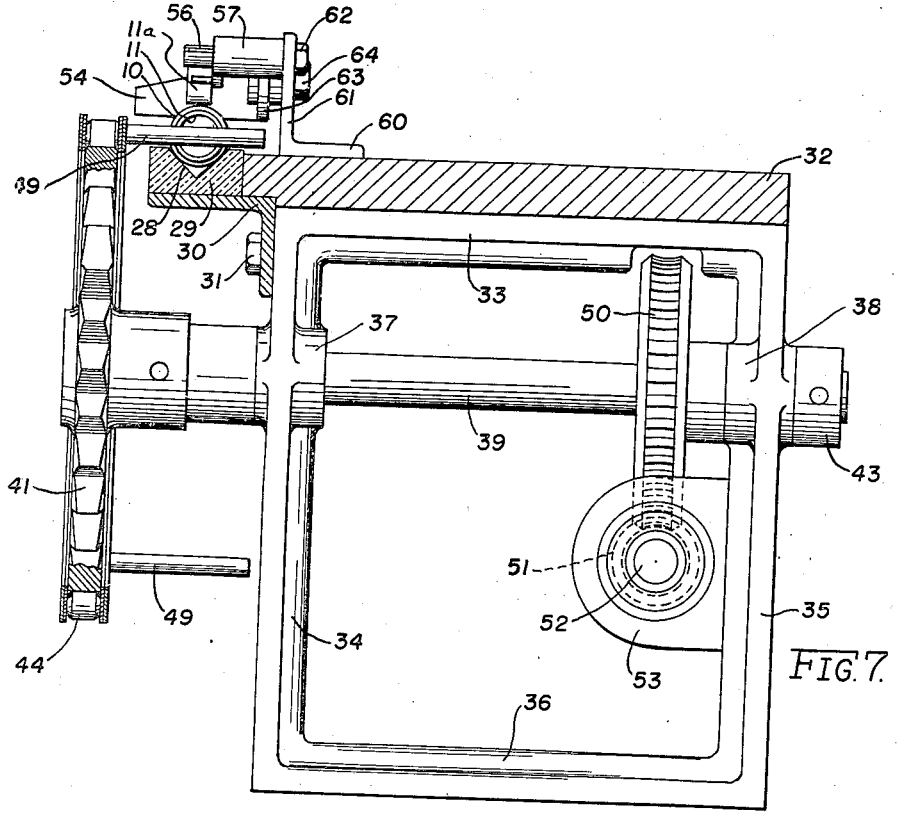
Figure 7 is a side sectional view in elevation taken substantialy along line VII—VII of Figure 3.
Figure 8:
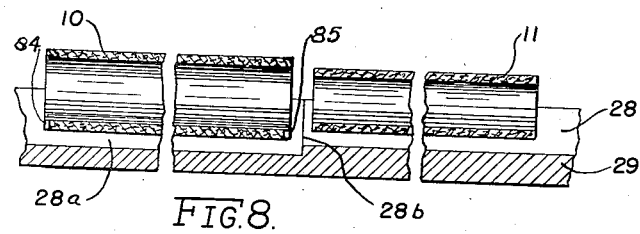
Figure 8 is a fragmentary sectional view of the tube telescoping guide taken substantially along line VIII—VIII of Figure 3 showing the tubes about to be telescoped in each other.
Figure 9:
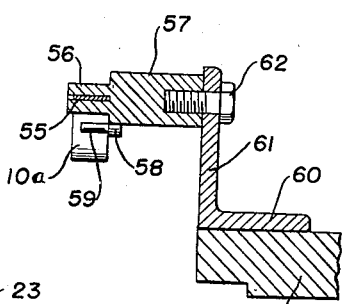
Figure 9 is a sectional view taken substantially along line IX—IX of Figure 3.

The table just mentioned comprises a flat top member or shelf 32 that is suitably anchored at its end portions upon the horizontal members 33 of substantially rectangular frames which have spaced front and rear uprights 34, and 35, and horizontal cross members 36 that connect the lower ends of the uprights 34—35 and are secured in any manner to the bed 12 of the structure upon which the bins 13 and 14 are mounted. Figure 7 illustrates the details of this table structure with the channeled bar 29 mounted upon its left-hand upper portion at the front edge of the shelf 32 that forms the top of the table.

The front and rear uprights 34—35 of the frames are provided with bearing bosses 37 and 38 respectively that are bored in alinement with each other to journal the horizontal shafts 39 and 40 that have sprocket-wheels 41 and 42 attached to their outwardly extended ends and also have retaining collars 43 secured to their rearwardly extended ends whereby said shafts are maintained against longitudinal movement while rotating in the bearing bosses 37 and 38. An endless chain 44 engages the sprockets and it is driven thereby. The intermediate portion of the lower reach of said chain 44 is engaged with an idle take-up sprocket 45 to reduce any slack that may occur in said chain 41.

The spindle 46 of the take-up sprocket 45 is readily adjustable up and down in a slot 47 that is formed in the lower portion of a hanger 48 which is secured to and depends from an adjacent portion of the table.

As shown, the upper reach of the chain 44 is in a horizontal plane and disposed in parallel relation to the channeled bar 29, and said chain is provided with a plurality of horizontally disposed fingers 49, 49, that project laterally therefrom so that they extend across the channeled bar 29 close to the top surface thereof. The chain 44 is actuated by means of a worm-gear 50 that is fast upon the shaft 39 of sprocket 41 and is driven by a worm 51 on a horizontal shaft 52 disposed with its axis transverse to the axis of sprocket shaft 39. The worm-shaft 52 is journaled in lugs 53, 53, projecting from the upright 35 with the worm 51 disposed between them, and one end of said worm shaft 52 projects beyond the adjacent lug and has suitable connection with any convenient source of power.

A large tube 10 and a small tube 11 are deposited by gravity from the discharge ends of their respective chutes A and B, into the channel 28 near the right-hand end of the bar and adjacent the starting end of the upper reach of the chain 44. Resting in the guide channel 28, the tubes 10 and 11 are nearly end to end and the major portions of their circumferences are above the horizontal plane of the top surface of the bar 27. In this position the approaching finger 49 on the chain 44 will engage the end of tube 11 causing it to move in the guide channel until the other or forward end of tube 11 contacts the near end of the larger tube 10 and the longitudinal movement of the tubes 10 and 11 in this tandem disposition continues in the guide channel 28 until the leading end of the large tube 10 will drop into an enlarged channel portion 28a that is formed by widening and deepening the channel 28 between a shoulder 28b and the left hand or removal end of the guide bar 29.

The dimensions of the channel portion 28a are such that when the larger tube 10 is disposed therein, and the smaller tube 11 is in the channel portion 28, the axes of the tubes will then be alined. In other words, the height of shoulder 28b or the increased dimensions of the channel 28a are equal to the thickness of the cylindrical wall of the tube 10. Since the inside diameter of tube 10 is but a small fraction less than the outside diameter of tube 11, said tubes are adapted to be telescoped, the one on the other, with the latter entering into the former to the extent shown in Figure 15. This telescoping or inserting of the tube 11 into the tube 10 is accomplished by the continued travel of the finger 49 with the chain 44 whilst said finger is in engagement with the rear end of the tube 11 and the tube 10 has been arrested by the stop element 54. In order to insure against the tubes 10 and 11 becoming dislodged from the guide channel 28 and its widened portion 28a during the telescoping operation, said tubes 10—11 are respectively engaged by yieldable presser members 10a and 11a that may be flat leaf springs as shown in detail in Figure 11. The presser members 10a and 11a, which are obliquely disposed in the line of travel of the tubes 10—11, have their free end portions angularly bent as at 10b and 11b, and their opposite ends are mounted in transverse slits 55, 55, in the reduced end portions 56, 56, of horizontal studs 57, 57. The studs 57, 57 are anchored to the vertical wall 61 of an angular strip or bar 60 by bolts 62, 62. The studs 57, 57 have arms 58, 58 that carry pins 59, 59 in the path of the presser members 10a—11a.

Figure 11:
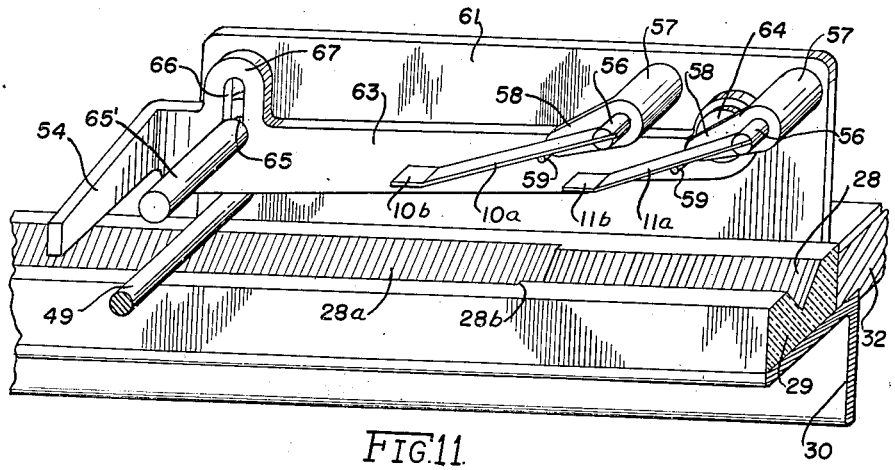
Figure 11 is a fragmentary perspective view of a guide groove and trip mechanism shown in Figure 7.
Figure 12:
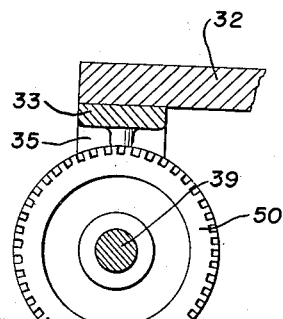
Figure 12 is a fragmentary sectional view of a worm drive taken substantially along line XII—XII of Figure 3.

The stop element 54, herein above mentioned, projects laterally away from the movable end portion of a horizontally disposed swinging arm 63, (shown in detail in Figures 5 and 11), that is fulcrumed at its opposite end upon pivot bolt 64 that is screwed into the vertical flange 61 of the angle-metal strip 60 between the studs 57, 57, which carry the presser members 10a and 11a. The swinging arm 63 is adapted for up and down movement at its end having the stop 54, and such movement is limited by a stop pin 65 with an enlarged end 65' which serves to keep the tubes from kicking up when under pressure. The stop pin 65 projects from the angle flange 61 into slot 66 in a lateral boss 67 on the adjacent end portion of the arm 63. In Figure 11 the swinging arm 63 is shown in its raised position with the stop pin 65 in the lower end of the slot 66, which permits the elevation of the lateral stop member 54 sufficiently above the telescoped tubes to clear said stop 54 and be moved by the finger 49 to the end of the channeled strip 29. The lower edge of the arm 63 is preferably inclined downwardly away from the fulcrumed end of said arm and there is a shoulder 68 on this lower edge that is in the path of and is adapted to be engaged by the end portion of a finger 49 at approximately the moment the smaller tube 11 has been inserted the desired distance into the larger tube 10, which distance as approximated in Figure 15, is substantially one-third the length of either or both tubes 10 and 11.

Figure 15:
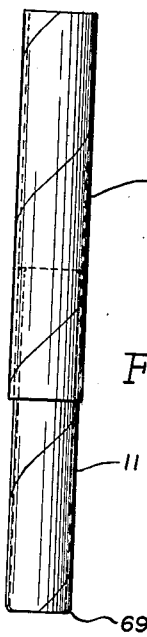
Figure 15 is a plan view of the inner and outer tubes telescoped together in assembled relation by means of the instrumentalities which are shown in Figures 1 to 11 inclusive.
Figure 13:
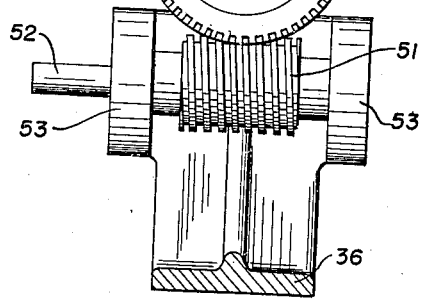
Figure 13 is a plan view in elevation of the interior tube.
Figure 14:
Figure 14 is a plan view in elevation of the exterior tube.
Figure 18:
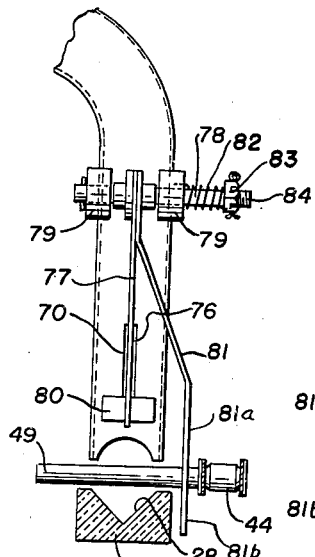
Figure 18 is a vertical edge view of the structure shown in Figure 16 looking at the left side thereof.
Figure 16:
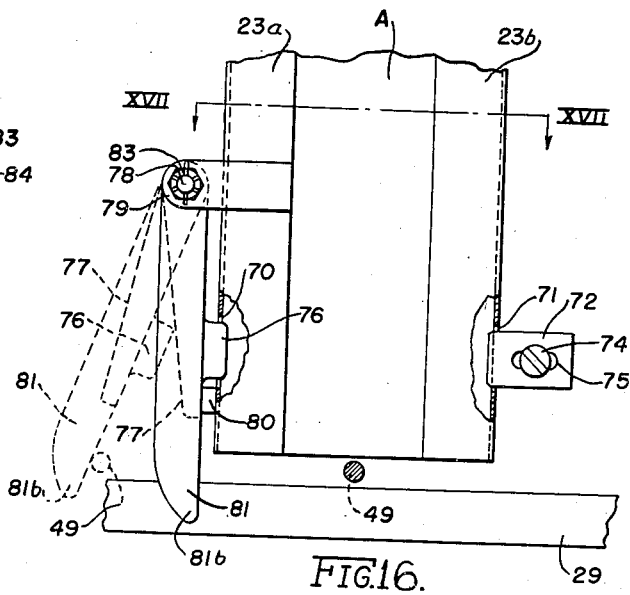
Figure 16 is a fragmentary elevation showing details of the devices for nicking the ends of the large tube of the applicator.

In order to facilitate the entry of the smaller tube 11 into the larger tube 10 the ends of the walls of the smaller tube are rounded or beaded as shown at 69 in Figures 13 and 15 which slightly reduces the outside diameter of the end edges of the cylindrical wall forming the tube. So long as the operator keeps a supply of the tubes 10—11 in the respective chutes A—B there is a continuity of operation, and as each finger 49 moves a pair of the tubes in the channel 28 away from the discharge ends of the chutes A—B, the next succeeding tubes in said chutes will gravitate into the channel in position to be moved by the next finger.

Prior to their discharge from chute A, the large tubes 10 are provided with indentations 10' at each end to afford frictional engagement with the surface of the inserted tube 11. This is accomplished by suitable instrumentalities at the lower end of the chute A as shown in Figures 16 to 20, wherein it will be seen that the side walls of said chute are provided with vertical slots 70 and 71, the latter to receive a stationary blade 72 which is carried upon a suitably shaped bracket 73 attached to the walls of the chute A. The work edge of the blade 72 protrudes into the chute at a distance to engage the ends of the tubes 10 stacked therein and said blade is adjustably mounted by means of a screw 74 which passes through a slot 75 in said blade and screws into the bracket 73. The opposing blade 76 which enters slit 70 embodies a lateral portion of a swinging arm 77 which is carried upon a pintle 78 journalled in bearing bosses 79—79 projecting from the walls of the chute A. At its lower end the arm 77 is engageable with a stop 80 below the slit 70, and the upper portion of said arm is suitably anchored to an operating finger 81 which has an oblique portion 81a to off-set its lower end portion 81b in the manner shown in Figure 18, where it will be seen that the said finger extends alongside the elongated guide bar 29 in which the tubes are disposed for telescopic engagement.

Figure 19:
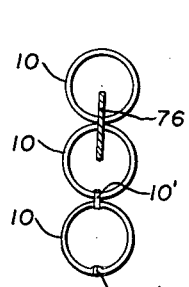
Figure 19 is a diagram showing the manner of nicking two tubes simultaneously.
Figure 17:
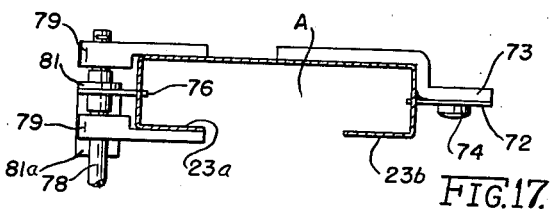
Figure 17 is a horizontal section of the nicking devices taken along line XVII—XVII of Figure 16.
Figure 20:
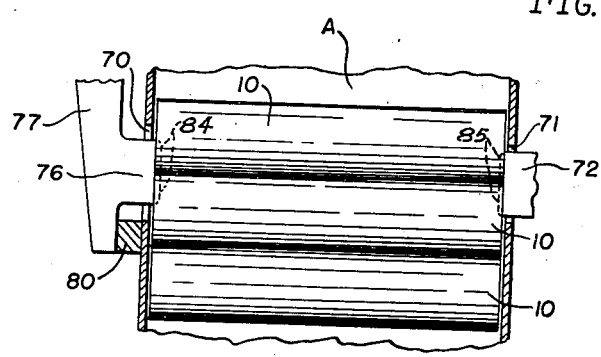
Figure 20 is a front elevation of the diagram shown in Figure 19.

A coiled spring 82 surrounds an extended end of pintle 78 with one of its ends engaging the adjacent boss 79 while its other end is engaged with a castellated nut 83 screwed upon the threaded end 84 of the pintle 78. The lower finger portion 81b is in the path of the studs 49 which move the tubes in the guide channel 28, and when engaged by one of said studs said finger will swing away from the chute A (to the left Figure 16) until the stud 49 passes under and releases the finger which permits the spring 82 to return the blade arm 77 to its normal position. This return movement causes the blade 76 to nick the proximate end edges of two superposed tubes in the stack as at 84 and the impact created by this action of the blade 76 is sufficient to cause the stationary blade 73 to nick the corresponding edges as at 85 of the same tubes as shown in Figures 19 and 20. The tension of the spring 82 is sufficient to maintain the blades 72—76 engaged with the tubes to hold them in the chute A until the lower finger portion 81b is actuated by the succeeding stud 49, and it will be understood that adjustment of the spring tension may readily be accomplished by rotating the nut 83 on the pintle 78 and locking said nut by a cotter-pin 83a.

While the invention is described in detail in its present preferred form or embodiment, it is obvious to those skilled in the art, after understanding said invention, that various changes and modifications may be made therein without departing from the spirit or scope thereof. It is the aim of the appended claims to cover all such changes and modifications.

What is claimed as new is:

1. An apparatus for telescoping tubes embodying means for separately guiding tubes to be telescoped transversely of their longitudinal axis, an elongated guide in the path of said first named guiding means upon which tubes are supported in pairs in endwise arrangement; means for bodily moving one of the tubes longitudinally and independently of the other tube to telescope said tubes; and means whereby the telescoped tubes are released from and moved away from the telescoping means.

2. An apparatus for telescoping tubes embodying means for separately guiding tubes to be telescoped transversely of and about their longitudinal axis, an elongate guide in the path of said first named guiding means upon which tubes are supported in pairs in endwise arrangement; means for advancing the pair of tubes along said guide; and means for laterally displacing one tube with respect to the other tube and arresting said displaced tube, said advancing means adapted to move the other tube bodily independent of the arrested tube whereby to telescope said tubes.

3. An apparatus for telescoping tubes embodying means for separately guiding tubes to be telescoped transversely of and about their longitudinal axis, an elongate guide in the path of said first named guiding means upon which tubes are supported in pairs in endwise arrangement; means for advancing the pair of tubes along said guide; means for laterally displacing one tube with respect to the other tube and arresting said displaced tube, whereby the advancing means is adapted to move the other tube bodily independent of the arrested tube, whereby said tubes are telescoped; and means whereby the telescoped tubes are released from and moved away from the telescoping means.

4. An apparatus for telescoping tubes embodying an elongate guide upon which tubes are supported in pairs in endwise arrangement; means for advancing the tubes along said guide; said guide being shaped intermediate its ends to laterally displace the leading tube to axially aline it with the trailing tube; means for bodily moving the trailing tube longitudinally and independently of the leading tube to telescope said tubes; and means whereby the telescoped tubes are released from the telescoping means.

5. An apparatus for telescoping tubes embodying a longitudinal guide upon which a pair of tubes are supported in endwise arrangement; a stop initially spaced from said tubes; means for moving the tubes towards said stop; and means in said guide for laterally displacing the leading tube prior to engagement with said stop, whereby to axially aline the proximate ends of said tubes.

6. An apparatus for telescoping tubes embodying a longitudinal guide upon which a pair of tubes are supported in endwise arrangement; a stop initially spaced from said tubes; means for moving the tubes towards said stop; means in said guide for laterally displacing the leading tube prior to engagement with said stop, whereby to axially aline the proximate ends of said tubes; and means for moving said stop out of the path of movement of the tubes to release the telescoped tubes.

7. An apparatus for telescoping tubes embodying a longitudinal guide upon which a pair of tubes are supported in endwise arrangement; a stop initially spaced from said tubes; means for advancing the tubes towards said stop; means in said guide for laterally displacing the leading tube prior to engagement with said stop; whereby to axially aline the proximate ends of said tubes, the continued movement of said advancing means adapted to enter the other tube into the arrested leading tube; and means on said advancing means adapted to lift said stop out of the path of the telescoped tubes.

8. An apparatus for telescoping tubes embodying a longitudinal guide upon which a pair of tubes are supported in endwise arrangement; a stop initially spaced from said tubes; means for moving the tubes towards said stop; and means in said guide for laterally displacing the leading tube prior to engagement with said stop, whereby to axially aline the proximate ends of said tubes, the continued movement of said advancing means adapted to enter the other tube into the arrested leading tube; a swinging arm upon which said stop is mounted; and means on said advancing means adapted to engage and swing said arm in a direction to move said stop out of the path of the telescoped tubes.

9. An apparatus for telescoping tubes embodying an elongate bar having a channel in which tubes are supported, said channel provided with an enlarged portion to receive the leading tube and axially aline it with the adjacent tube; means for advancing the tubes longitudinally in said channel; devices for discharging tubes into said channel; and a stop associated with the enlarged portion of said channel adapted to momentarily arrest the tube disposed in said enlarged channel portion; whereby continued movement of said advancing means is adapted to enter the other tube into the arrested tube.

10. An apparatus for telescoping tubes embodying an elongate bar having a channel in which tubes are supported in endwise arrangement, said channel provided with an enlarged portion to receive the leading tube and axially aline it with the adjacent tube; means for advancing the tubes longitudinally in said channel; devices for discharging tubes into said channel; a movable stop associated with the enlarged portion of said channel adapted to momentarily arrest the tube disposed in said enlarged channel portion; and means for displacing said stop after the tubes have been telescoped a predetermined distance.

11. An apparatus for telescoping tubes embodying an elongate bar having a channel in which tubes are supported in endwise arrangement, said channel provided with an enlarged portion to receive the leading tube and axially aline it with the adjacent tube; means for advancing the tubes longitudinally in said channel; devices for discharging tubes into said channel; a displaceable stop associated with the enlarged portion of said channel adapted to momentarily arrest the tube disposed in said enlarged channel portion; means for permitting continued relative bodily movement of the trailing tube while the leading tube is momentarily arrested, whereby said trailing tube is entered into said arrested tube.

12. An apparatus for telescoping tubes embodying an elongate bar having a channel in which tubes are supported in endwise arrangement, said channel provided with an enlarged portion to receive the leading tube and axially aline it with the adjacent tube; means for moving a pair of tubes longitudinally in endwise arrangement in said channel; devices for separately discharging tubes into said channel; a displaceable stop associated with the enlarged portion of said channel adapted to momentarily arrest the tube disposed in said enlarged channel portion; and means engaged by portions of the tube advancing means adapted to displace said stop after telescopic movement of the tubes has progressed a predetermined distance.

13. A method of telescoping tubes embodying advancing a pair of tubes tandem-wise in a guide in non-axial alinement; displacing the leading tube into axial alinement with the trailing tube; bodily moving the trailing tube independent of the leading tube, whereby to enter the former tube into the proximate end of the latter tube; and continuing the advance of the telescoped tubes to discharge them from the guide.

14. A method of telescoping tubes embodying separately discharging a pair of tubes upon a guide in non-axial alinement; advancing the tubes in the guide; displacing the leading tube into axial alinement with the trailing tube; momentarily arresting advance of the leading tube after displacement; and continuing the advance of the trailing tube during arrest of the leading tube to telescope one tube into the other tube a predetermined distance.

15. A method of telescoping tubes embodying separately discharging a pair of tubes upon a guide in non-axial alinement; advancing the tubes tandem-wise in the guide; arresting the advance of the leading tube in axial alinement with the trailing tube; bodily moving the trailing tube during arrest of the leading tube, whereby to enter the trailing tube into the proximate end of the leading tube; and continuing the advancing movement of the telescoped tubes to a discharge portion of the guide.

JOHN R. McLAUGHLIN.